Oct. 12, 1965  H. M. DAY ETAL  3,212,016
AVALANCHE DIODE MICROWAVE DETECTOR
Filed July 30, 1962
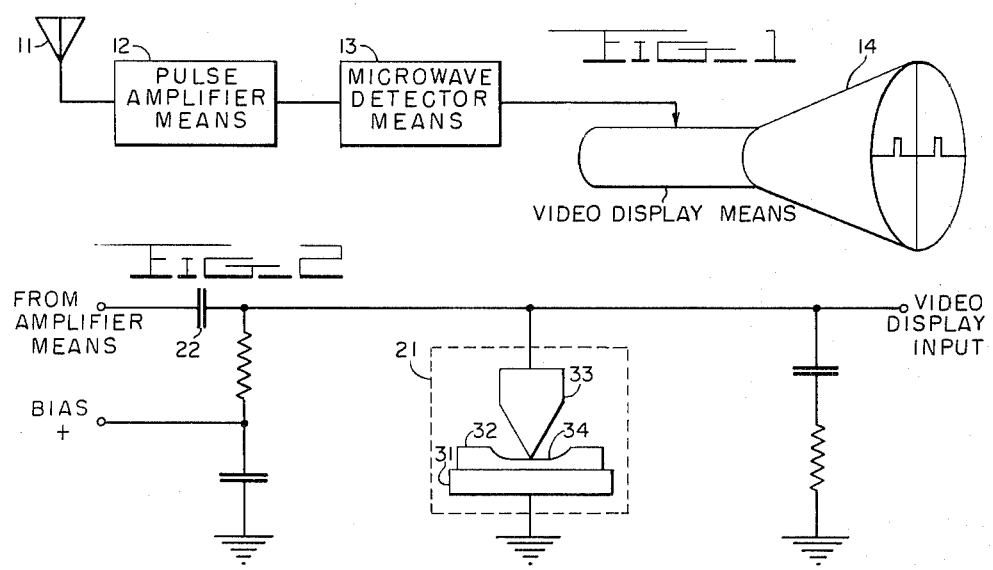
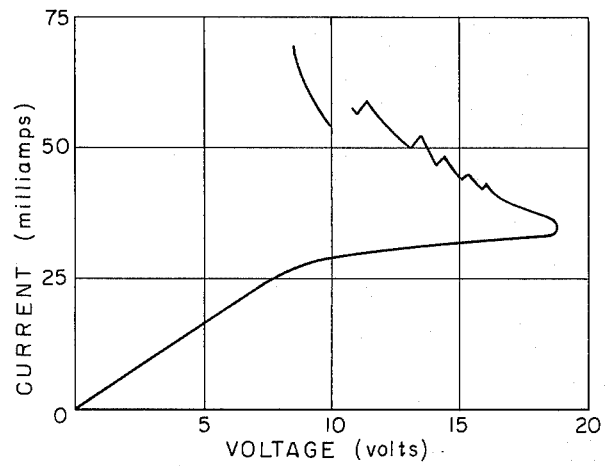
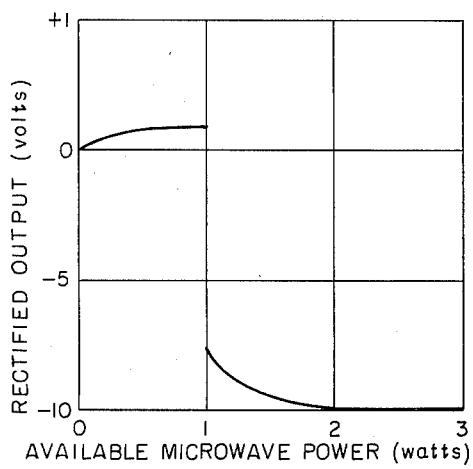
INVENTORS
HOWARD M. DAY
ALAN C. MACPHERSON
BY
ATTORNEY

United States Patent Office 3,212,016
Patented Oct. 12, 1965

3,212,016
AVALANCHE DIODE MICROWAVE DETECTOR
Howard M. Day, Oxon Run Hills, and Alan C. Macpherson, District Heights, Md., assignors to the United States of America as represented by the Secretary of the Navy
Filed July 30, 1962, Ser. No. 213,554
4 Claims. (Cl. 329—205)
(Granted under Title 35, U.S. Code (1952), sec. 266)

The invention described herein may be manufactured and used by or for the Government of the United States of America for governmental purposes without the payment of any royalties thereon or therefor.

This invention relates in general to nonlinear semiconductor devices and in particular to such devices suitable for high power microwave applications.

Modern day high resolution radar systems generally involve the observation and detection of sharp square wave pulses which must be subjected to high level amplification upon reception to provide proper input to a video display. It is recognized good practice in such systems to employ a TRF receiver design wherein the received signal is amplified prior to detection since this receiver design has a broadband characteristic, which is often requisite therein.

Heretofore a variety of non-linear devices have been employed as high level microwave detectors in high resolution radar systems with varying degree of success. Few, if any, high resolution radar systems have included semiconductor microwave detectors which heretofore have been subject to deterioration under high voltage conditions. With the advent of the high velocity missile era and the increased emphasis on high resolution detection systems the need for a static device of high reliability in high level applications has become more apparent.

Accordingly:

It is an object of this invention to provide a non-linear semi-conductor device suitable for use in a variety of high level applications.

It is another object of this invention to provide a microwave detector means which may be subjected to relatively high energy levels without serious deterioration.

It is still another object of this invention to provide a broadband receiver system having a high level output.

Other objects of this invention will become apparent upon a more comprehensive understanding of the invention for which reference is had to the following specification and drawings wherein;

FIG. 1 is a block diagram of a high resolution radar receiver embodying the non-linear semiconductor device of this invention in a microwave detector application.

FIG. 2 is a schematic showing of a microwave detector in accordance with the embodiment of FIG. 1.

FIG. 3 is a graphic presentation of the static characteristic of the non-linear semiconductor device of this invention.

FIG. 4 is a graphic presentation of the rectification characteristics of the non-linear semiconductor device of this invention.

Briefly, this invention provides an avalanche injection non-linear semiconductor device having characteristics suitable for use in most high-level non-linear device applications. The invention is particularly adaptable to microwave detector application in high resolution radar receivers.

Referring now to the drawings;

FIG. 1 depicts a high resolution radar receiver comprising microwave antenna 11, pulse amplifier means 12 connected thereto, microwave detector means 13 connected to the output of amplifier 12 and video display means 14 connected to the output of detector means 13. It will be appreciated, of course, that the antenna 11 is of the directional variety, that the amplifier means 12 may comprise one or more amplification stages, and that the video display means 14 may be other than as shown if desired. While the antenna 11, amplification means 12 and the display means 14 may be of conventional design, the microwave detector 13 is particularly unique in the incorporation of a selected high level semiconductor device as the non-linear element thereof.

FIG. 2 shows a schematic diagram of a unique microwave detector in accordance with the invention and suitable for insertion as the microwave detector 13 in the receiver shown in the FIG. 1. Basically, the detector comprises a non-linear semiconductor device 21 adapted for connection across the input of the video display means which consists of a metallic base section 31, such as brass: a section of N type material 32, such as 0.2 ohm-cm. N type silicon, bonded to the metallic base section to provide an ohmic contact and a point contact junction, utilizing a tungsten cats whisker 33 within an area of the N type material having a minute thickness, for example ten microns thickness, such as an etched depression or etchpit area, as indicated at 34.

In the detector of FIG. 2, microwave energy from conventional electronic amplifier means not shown, is applied to the semiconductor device 21 via a coupling capacitor 22. It is understood, of course, that it is within the purview of this disclosure to apply microwave energy to the semiconductor means by other means, if desired. For example, microwave energy processed via travelling wavetube amplifier means may be directly impinged on the semiconductor device 13 in selected applications.

The detector shown in FIG. 2 has been operated at 9350 mc. and has been found to provide 12 volts across 200 ohms, with input power ranging from 1 to 3 watts. In addition, the detector has been found to deliver, at somewhat lower input, more rectifier power than was available from the microwave source.

In the formulation of this operational embodiment, an ohmic contact was provided, at the metallic base punction by lightly alloying from a thin vacuum deposited layer of AU–0.6% Sb before plating with nickel for soldering and the assembly was installed in a standard 1N23 package. In this embodiment, the thickness of the silicon between the bottom of the etchpit area and the ohmic contact was 10 microns and the radius of the tungsten point was approximately 2 microns.

FIG. 3 depicts the IV characteristic of a detector in accordance with the embodiment of FIG. 2 with the point biased positive with respect to the semiconductor base (forward direction) as might be observed on an oscilloscope trace.

FIG. 4 depicts the rectification characteristics of a detector in accordance with the embodiment of FIG. 2 operating at 9350 mc. with the bias at 16 volts and the video load at 200 ohms as observed on an oscilloscope trace.

The static characteristic as shown in FIG. 3 and the rectification characteristic as shown in FIG. 4 are demonstrative of an avalanche injection effect which, in general, is not characteristic of commercially available microwave rectifier diodes utilizing P-type silicon material.

Comparable rectification measurements have been made on commercially available microwave rectifier diodes and on the non-linear semiconductor device of this invention using a pulsed microwave source and an oscilloscope display. It was found that the commercial diodes deliver about 3 volts or 40 milliwatts to a 200 ohm load whereas the avalanche injection microwave diodes readily deliver 10 volts or 500 milliwatts to the same load.

For the avalanche injection microwave device, the dependence of rectified power on available microwave power for fixed tuning appears to depend strongly on the bias. The characteristic curve of FIG. 4 is for a bias about 3 volts below the breakdown voltage. It will be noted that the rectified voltage undergoes a change in polarity after this discontinuity. As shown in FIG. 4, there is a range of power input, in this case from 1 to 3 watts in which the output is nearly independent of the input.

Further, it has been found that at low input power, in the 30 to 50 milliwatt range, for example, the avalanche injection semiconductor device of this invention exhibits a power gain which appears to be related to the negative resistance of the device and that this power gain effect generally involves a critical tuning and bias consideration.

While the specifically described embodiment of the non-linear semiconductor device of this invention has included a layer of N type silicon, it will be appreciated that any semiconductor material in which an avalanche injection condition might be produced at relatively low values, in particular any semiconductor material characterized by high melting point and a large band gap, may be substituted for the N type silicon layer, if desired.

As pointed out above, it is advantageous in some embodiments to utilize a layer of N type material having a minimum thickness at the point contact junction. By this minimum thickness the voltage required to establish a depletion layer which extends completely across from one electrode to the other is greatly reduced. It will be appreciated, of course, that an increase in field is directly proportional to applied voltages in most instances. Moreover, it is understood that the component and material values set forth above in the course of the disclosure of the illustrated embodiment of the invention are merely exemplary in nature, and that the values are not to be considered as limitations of the device of this invention.

Finally, it is understood that this invention is to be limited solely by the scope of the claims appended hereto.

What is claimed is:

1. In a circuit for the detection of large amplitude microwave signals including an avalanche-injection microwave diode forward-biased to high detection sensitivity, said diode comprising:

a first layer of metallic material;
a second layer of N type semiconductor material, characterized by a high melting point and a large band gap in which an avalanche-injection condition may be produced;
said first layer being bonded to said second layer to form an ohmic contact;
said second layer having an area of minute thickness;
and cat whisker means of the tungsten variety associated with said second layer to form a point contact junction in said area of minute thickness;
and the potential creating said forward-bias biases said diode to the threshold of breakdown such that the presence of said microwave signals will cause said diode to break down.

2. In a circuit for the detection of large amplitude microwave signals including an avalanche-injection microwave diode forward-biased to high detection sensitivity, said diode comprising:

a first layer of metallic material;
a second layer of semiconductor material in low-resistivity ohmic contact with said first layer;
said second layer of semiconductor material having a cavity etched therein, whereby the resistance of the diode is lowered in this area enhancing avalanche injection;
and a cat whisker contacting said second layer within said cavity area to form a point contact junction with said second layer;
and the potential creating said forward-bias biases said diode to the threshold of breakdown such that the presence of said microwave signals will cause said diode to break down.

3. The microwave detector as defined in claim 1, wherein said diode comprises a first layer of brass; a second layer of silicon with said area being an etched pit area; and a deposit of gold-antimony between said first and second layers, so that upon soldering said first layer to said second layer the resistivity of said ohmic contact caused thereby is low.

4. The microwave detector as defined in claim 3 wherein said second layer is 0.2 ohms-cm. N type silicon and the etch pit area has a thickness of approximately 10 microns.

References Cited by the Examiner

UNITED STATES PATENTS 2,468,655  4/49  Cole et al. _____ 329—162
2,713,132  7/55  Matthews et al. _____ 307—88.5

OTHER REFERENCES

Gibson et al.: "Avalanche Injection Diodes," Solid-State Electronics, Pergamon Press, 1960, vol. 1, pp. 54–69. Printed in Great Britain.

Miller et al.: Bell System Tech. Jour., September 1955, "Alloyed Junction Avalanche Transistors," pp. 883–903 (order 883–885).

ROY LAKE, *Primary Examiner.*

ALFRED L. BRODY, *Examiner.*